United States Patent
Chang et al.

(10) Patent No.: US 11,814,583 B2
(45) Date of Patent: Nov. 14, 2023

(54) DIVERTING AGENTS FOR WELL STIMULATION

(71) Applicant: Saudi Arabian Oil Company, Dhahran (SA)

(72) Inventors: Fakuen Frank Chang, Houston, TX (US); Wenwen Li, Pearland, TX (US)

(73) Assignee: Saudi Arabian Oil Company, Dhahran (SA)

(*) Notice: Subject to any disclaimer, the term of this patent is extended or adjusted under 35 U.S.C. 154(b) by 147 days.

(21) Appl. No.: 17/369,149

(22) Filed: Jul. 7, 2021

(65) Prior Publication Data

US 2022/0025251 A1   Jan. 27, 2022

Related U.S. Application Data

(60) Provisional application No. 63/055,005, filed on Jul. 22, 2020.

(51) Int. Cl.
| | | |
|---|---|---|
| *C09K 8/88* | (2006.01) | |
| *C09K 8/60* | (2006.01) | |
| *C09K 8/70* | (2006.01) | |

(52) U.S. Cl.
CPC .............. *C09K 8/887* (2013.01); *C09K 8/604* (2013.01); *C09K 8/703* (2013.01)

(58) Field of Classification Search
CPC ......... C09K 8/887; C09K 8/604; C09K 8/703
See application file for complete search history.

(56) References Cited

U.S. PATENT DOCUMENTS

| | | | |
|---|---|---|---|
| 4,951,751 A | 8/1990 | Jennings, Jr. | |
| 7,506,689 B2 | 3/2009 | Surjaatmadja et al. | |
| 7,569,523 B2 | 8/2009 | Cooke, Jr. | |
| 8,318,820 B2 | 11/2012 | Guelcher et al. | |
| 8,905,133 B2* | 12/2014 | Potapenko | E21B 43/267 166/305.1 |
| 9,309,454 B2 | 4/2016 | Smith et al. | |
| 10,030,494 B2 | 7/2018 | Walters et al. | |
| 2011/0155374 A1* | 6/2011 | Mackay | C09K 8/12 166/295 |
| 2014/0144637 A1* | 5/2014 | Gerrard | C09K 3/22 166/300 |

(Continued)

FOREIGN PATENT DOCUMENTS

| | | |
|---|---|---|
| WO | 2011154712 | 12/2011 |
| WO | 2016100647 | 6/2016 |
| WO | 2016186675 | 11/2016 |

OTHER PUBLICATIONS

Zhang et al., "A novel targeted plugging and fracture-adaptable gel used as a diverting agent in fracturing," Energy Science & Engineering 8.1, Jan. 2020, 8:116-133, 18 pages.

(Continued)

*Primary Examiner* — Crystal J. Lee
(74) *Attorney, Agent, or Firm* — Fish & Richardson P.C.

(57) ABSTRACT

The present application provides expandable chemical diverting agents, such as flexible polyurethanes and swellable hydrogels, or chemical precursors thereof. Methods of using these expandable diverting agents for treating a subterranean formation are also provided. An example of subterranean formation treatment process described in the present application is wellbore stimulation, such as hydraulic fracturing or matrix acid treatment.

12 Claims, 7 Drawing Sheets

(56) References Cited

U.S. PATENT DOCUMENTS

| | | | | |
|---|---|---|---|---|
| 2015/0159465 A1* | 6/2015 | Lecerf | ............... | E21B 43/267 166/285 |
| 2015/0353768 A1* | 12/2015 | Yamada | ............... | C09D 5/02 524/591 |
| 2016/0115759 A1* | 4/2016 | Richards | ............... | E21B 33/138 166/115 |
| 2018/0016411 A1* | 1/2018 | Wang | ............... | C08K 5/09 |
| 2018/0149008 A1* | 5/2018 | Nguyen | ............... | E21B 43/267 |
| 2018/0346786 A1 | 12/2018 | Zielinski et al. | | |

OTHER PUBLICATIONS

PCT International Search Report and Written Opinion in International Appln. No. PCT/US2021/042783, dated Nov. 9, 2021, 13 pages.

\* cited by examiner

DIVERTING AGENTS FOR WELL STIMULATION

CLAIM OF PRIORITY

This application claims priority to U.S. Patent Application Ser. No. 63/055,005, filed on Jul. 22, 2020, the entire contents of which are hereby incorporated by reference.

TECHNICAL FIELD

This invention relates to diverting agents, and in particular to chemical diverting agents capable of expanding in volume to seal a flow channel within a subterranean formation, such as a fracture or a wormhole.

BACKGROUND

Recoverable fluids, such as hydrocarbons (for example, petroleum or natural gas) and water, are frequently found in subterranean formations. Production of a recoverable fluid from a subterranean formation often requires drilling onto the subterranean formation to produce a wellbore through which the recoverable fluid is brought to the surface. In order to optimize the wellbore productivity, a stimulation treatment is sometimes necessary.

Examples of stimulation treatments include hydraulic fracturing and matrix stimulation. Hydraulic fracturing includes pumping a fracturing fluid into the wellbore at a high pressure, causing a formation rock to crack and a flow channel (a fracture) to open, extending away from the wellbore and into the subterranean formation. In contrast, matrix stimulation may include treating a carbonate-containing segment of the subterranean formation with an acid or an organic solvent at a pressure that is below fracturing pressure. This chemical treatment dissolves the carbonate material of the rock and creates new, highly conductive flow channels (wormholes) within the subterranean formation.

The new flow channels (fractures and wormholes) resulting from the well stimulation and protruding into the subterranean formation increase its permeability to the recoverable fluid and enhance productivity of the wellbore. However, a successful stimulation treatment requires even distribution of the multiple hydraulic fractures or acid-treated wormholes along the targeted segment of the wellbore. This is challenging when the stimulated subterranean formation segment is long or heterogeneous, which is often the case for long horizontal wells and multi-layered reservoirs.

An even stimulation of the desired area may be achieved by using a diverting agent (or a diverter). The diverters are used to block dominant flow channels and to force (or divert) the stimulation fluid to increase the smaller flow channels or to propagate new fractures and wormholes in the desired area. Generally, both mechanical and chemical diverters can be used. Mechanical diverters, such as ball sealers, could be effective, but their use is limited by high costs associated with additional equipment that is necessary to carry out the treatment, such as tractors, vibrators, and packers. Chemical diverters, such as foams, viscous fluids, gels, particulates of various sizes, fibers, or mixtures of the foregoing, could be injected downhole to create flow resistance and reduce fluid mobility inside the dominant channels.

However, the use of chemical diverters for sealing dominant channels is limited by the fact that the sizes, dimensions, and volumes of fractures, wormholes, and perforations are generally unknown and are constantly growing during the stimulation process. Because the dominant channels keep increasing in size despite the presence of the diverting agent in those channels, the existing chemical diverters are ineffective.

SUMMARY

In a general aspect, the present disclosure provides a method of treating a subterranean formation penetrated by a wellbore and including a flow channel protruding from an outside diameter of the wellbore into the subterranean formation, the method including introducing into the flow channel a diverting agent that is adapted to expand in response to an increase in size or volume of the flow channel thereby maintaining or increasing a contact area between the diverting agent and an inner surface of the flow channel.

In some embodiments, the treating of the subterranean formation includes stimulation of the subterranean formation.

In some embodiments, the stimulation includes hydraulic fracturing.

In some embodiments, the flow channel includes a fracture.

In some embodiments, the stimulation includes an acid treatment.

In some embodiments, the flow channel includes a wormhole.

In some embodiments, the diverting agent includes a flexible porous polyurethane material.

In some embodiments, the flexible porous polyurethane material includes a polyurethane foam.

In some embodiments, introducing the diverting agent into the flow channel includes introducing into the flow channel a slurry having solid particles of the flexible porous polyurethane material.

In some embodiments, introducing the diverting agent into the flow channel includes introducing into the flow channel a liquid pre-polymer blend having a polyisocyanate component and a polyol component.

In some embodiments, the polyisocyanate component and the polyol component chemically react in the flow channel to produce the flexible porous polyurethane material.

In some embodiments, the diverting agent comprises polyurethane particles.

In some embodiments, introducing the diverting agent into the flow channel comprises introducing into the flow channel a slurry comprising the polyurethane particles.

In some embodiments, introducing the diverting agent into the flow channel comprises introducing into the flow channel a liquid pre-polymer blend comprising a polyisocyanate component and a polyol component.

In some embodiments, the polyisocyanate component and the polyol component chemically react in the flow channel to produce the polyurethane particles.

In some embodiments, the diverting agent includes a crosslinked hydrogel.

In some embodiments, the crosslinked hydrogel includes a plurality of polymer fibers selected from natural polymers, synthetic polymers, and a hybrid of natural and synthetic polymers.

In some embodiments, the polymer fibers of the crosslinked hydrogel are crosslinked by a crosslinking agent.

In some embodiments, the crosslinked hydrogel is expandable by absorbing a fluid.

In some embodiments, the fluid includes water.

In some embodiments, the method of the present disclosure includes introducing a treatment fluid into the wellbore before, after, or concurrently with introducing the diverting agent into the flowing channel.

In some embodiments, the treatment fluid is a stimulation fluid.

In some embodiments, the diverting agent is degradable.

In some embodiments, the diverting agent is degradable by hydrolysis, oxidation, or reduction.

In some embodiments, the diverting agent is degradable by light, heat, or pressure.

Unless otherwise defined, all technical and scientific terms used herein have the same meaning as commonly understood by one of ordinary skill in the art to which the present disclosure belongs. Methods and materials are described herein for use in the present disclosure; other, suitable methods and materials known in the art can also be used. The materials, methods, and examples are illustrative only and not intended to be limiting. All publications, patent applications, patents, sequences, database entries, and other references mentioned herein are incorporated by reference in their entirety. In case of conflict, the present specification, including definitions, will control. Other features and advantages of the present disclosure will be apparent from the following detailed description and figures, and from the claims.

DETAILED DESCRIPTION

The present disclosure provides expandable chemical diverters. One example of the expandable diverters of the disclosure includes a liquid material that could be injected or pumped downhole, alone or in combination with any other treatment fluid. Another example of the expandable diverter of the disclosure includes solid flexible material that could be pumped downhole as a slurry. In this example, the solid material of the slurry may include solid flexible particles of the expandable diverter material adapted to contract under pressure and expand when the pressure is reduced or eliminated.

The expandable diverter of the present disclosure can flow into a dominant channel of any size or shape, having any opening dimension. The diverter can then expand in size, weight, or volume, to become a viscous gel or liquid, or a flexible, compressible foam or solid, to fully conform to the size and shape of the channel. The diverter is capable of continuously expanding in response to an increase in size or volume of the channel that the diverter occupies, thereby effectively sealing the channel and preventing the wellbore fluid from flowing into the channel. Advantageously, the expandable chemical diverters of the present disclosure allow for smooth injection process, are compatible with other treatment fluids and recoverable fluids, can tolerate downhole conditions, including high pressure and temperature, and are very cost effective. What is more, the expandable diverters of the present disclosure are degradable or otherwise fully removable from the flow channels within the subterranean formation after completion of the stimulation treatment. Overall, the expandable diverters described herein allow to achieve additional flow capacity and increased production of a recoverable fluid (e.g., water or a hydrocarbon) from the subterranean formation after a stimulation treatment.

At any time during extraction of a recoverable fluid, such as water, oil, or natural gas, from a subterranean formation, the recovery of the fluid may be suboptimal due to poor flow of the fluid from the reservoir to the wellbore. In such a situation, the subterranean formation, such as a reservoir section of the subterranean formation, may be stimulated to restore or enhance productivity of the wellbore. One example of stimulation treatment is hydraulic fracturing. Fracturing treatments are typically performed by pumping a fracturing fluid downhole to create a pressure in a wellbore that is above the fracture pressure of the formation rock. Under this pressure, the rock cracks and opens up highly conductive flow paths and channels (also referred to as fractures) extending from an outside diameter of the wellbore into the subterranean formation and connecting the wellbore with the reservoir. Another example of stimulation treatment is matrix stimulation, which often includes pumping downhole a stimulation fluid, which often includes an acid fluid, an organic solvent, or any other fluid capable of dissolving at least one material of the subterranean formation. For example, an acid stimulation can dissolve carbonates, such as limestone, leaving flow paths and cannels (also referred to as wormholes) between the wellbore and the reservoir. A result of an exemplary stimulation treatment 100 is shown in FIG. 1.

Figure 1:
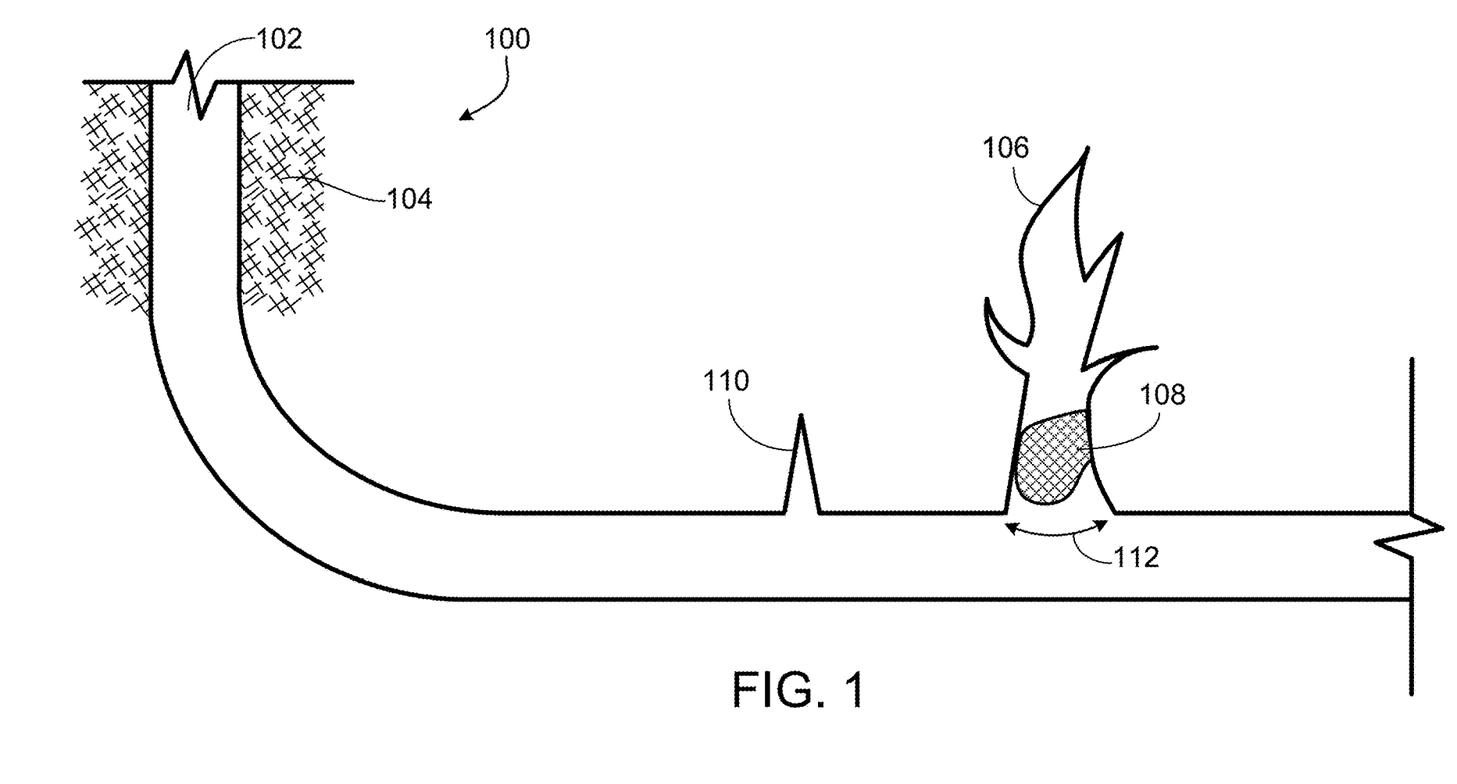
FIG. 1 is a schematic illustration of a stimulation treatment of a wellbore with a conventional chemical diverter.

Referring to FIG. 1, when a stimulation fluid is injected into a wellbore 102 penetrating a subterranean formation 104, a dominant flow channel 106 is propagated. In order to increase productivity of the wellbore 102, numerous flow channels similar to dominant flow channel 106 are desired. To initiate propagation of new flow channels, a conventional chemical diverter 108 is injected. Examples of a conventional chemical diverter 108 include foam, naphthalene, calcium chloride, benzoic acid flakes, guar gum, paraformaldehyde, and a gel such as polyacrylamide. When conventional chemical diverter 108 flows into and seals the dominant flow channel 106, a new flow channel 110 may be propagated in the subterranean formation 104. The stimulation treatment is continued to allow the new flow channel 110 to germinate and spread from the outer wall of the wellbore 102 into the subterranean formation 104, to connect the wellbore 102 with the reservoir. However, because the conventional chemical diverter 108 has constant size, shape, or volume, under the stimulation treatment conditions, the width or diameter of the opening 112 of the dominant flow channel 106 is continuously increasing, leading to an exemplary stimulation treatment result 114 shown in FIG. 2.

Figure 2:
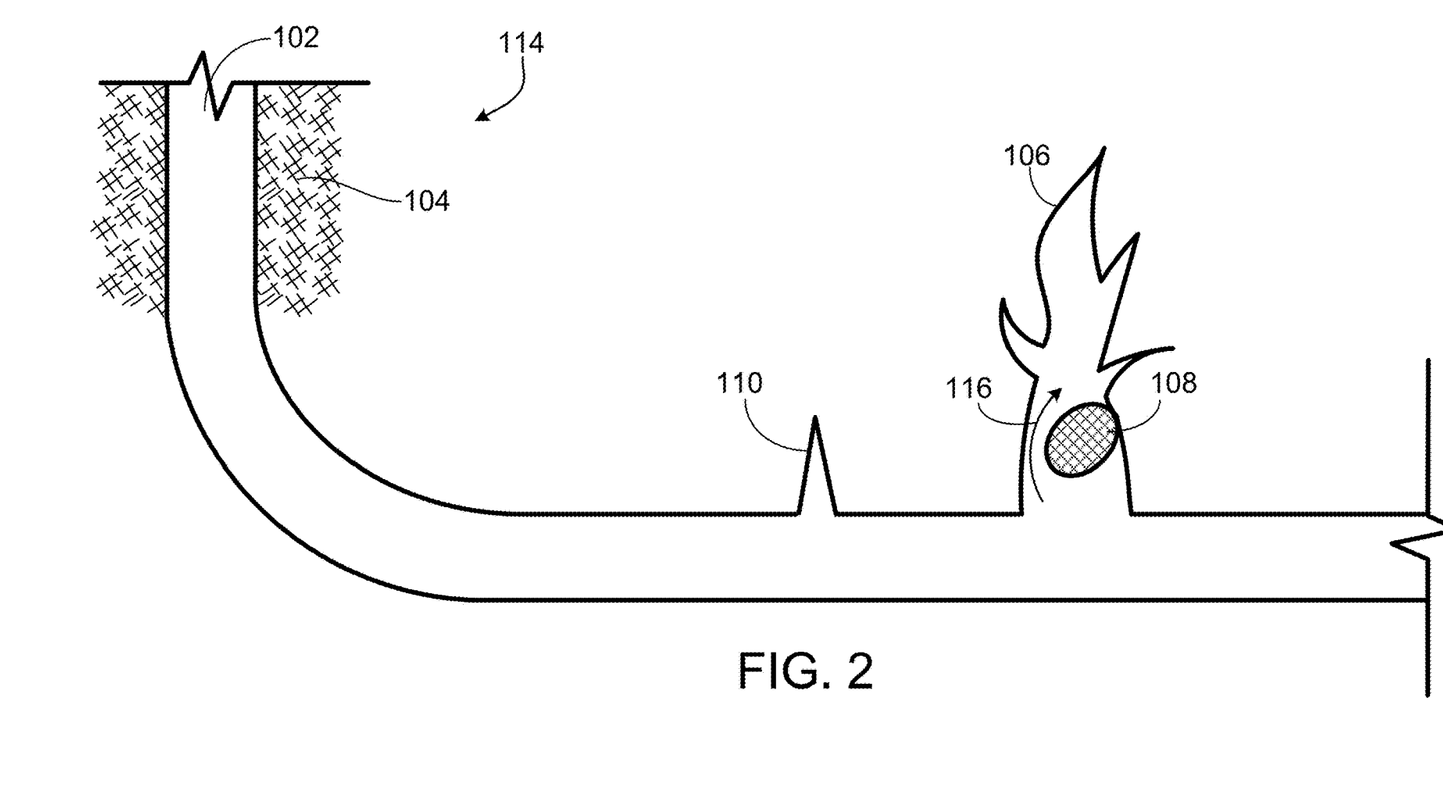
FIG. 2 is a schematic illustration of a loss of efficiency of stimulation treatment of a wellbore with a conventional chemical diverter.

Referring to FIG. 2, the conventional chemical diverter 108 loses its efficiency, allowing the stimulation fluid to flow into the dominant channel between the inner surface of the dominant flow channel 106 and the outer surface of the conventional chemical diverter 108 along the direction 116. This leads to further increase in the size and volume of the dominant flow channel 106, but the additional channels such as new flow channel 110 remain of the same size and volume, or develop only insignificantly. An additional amount of the conventional chemical diverter 108 may be required, leading to an undesired increase in cost of the stimulation treatment.

Figure 3:
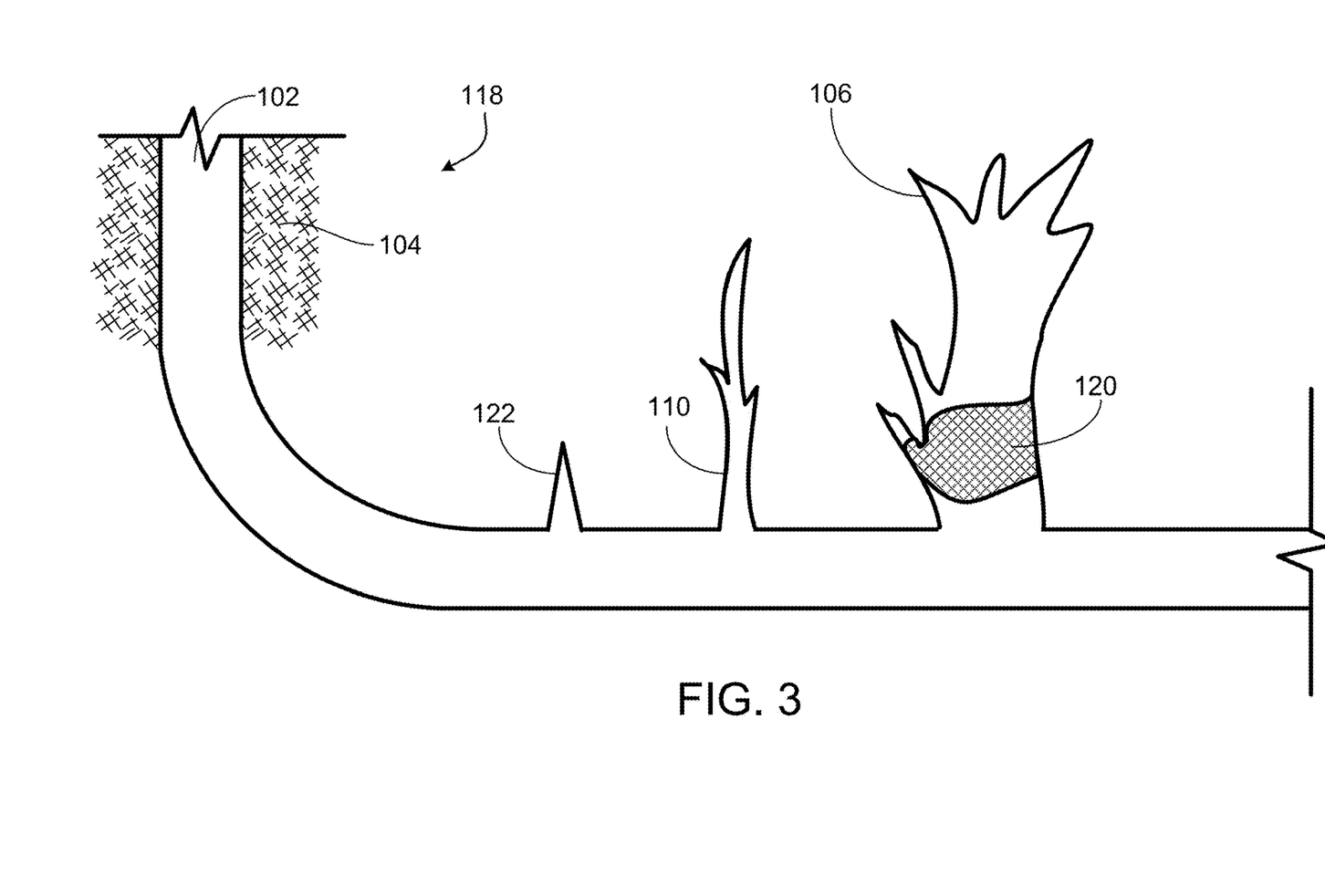
FIG. 3 is a schematic illustration of a stimulation treatment of a wellbore with an exemplary expandable chemical diverter of the present disclosure.

The present disclosure provides expandable diverting agents. An exemplary result 118 of a wellbore stimulation treatment with an expandable diverter 120 of the present disclosure is shown in FIG. 3. Referring to FIG. 3, unlike the conventional chemical diverter 108 that is made of impervious material having stable shape, size, and volume (see FIGS. 1 and 2), an expandable diverter 120 of the present disclosure expands in size, weight, or volume in response to an increase in size, dimension, or volume of the dominant flow channel 106 under the stimulation conditions. In one example, the expansion of the expandable diverter 120 creates a force that pushes against the inner surface of the dominant flow channel 106, thereby maintaining or increasing a contact area between the expandable diverter 120 and the inner surface of the dominant flow channel 106. In other words, by continuously increasing in volume in response to an increase in volume of the dominant flow channel 106, the expandable diverter 120 maintains a continuous contact with the inner surface of the dominant flow channel 106 and seals the opening of the dominant flow channel 106.

The force (e.g., elastic force) created by expansion of the expandable diverter 120 is also sufficient to counteract the force of the treatment fluid flowing from the wellbore 102 into the dominant flow channel 106. That is, in one example, the expandable diverter 120 pushes against the stimulation fluid and prevents the fluid from flowing into the dominant flow channel 106. Instead, the stimulation fluid flows into and contributes to the germination and spread toward the reservoir of the smaller new flow channel 110. In addition, new flow channels such as flow channel 122 may be propagated. In sum, using an expandable diverter of the present disclosure in a wellbore stimulation process leads to multiple hydraulic fractures or dissolution wormholes along the wellbore, penetrating through the subterranean formation and into the reservoir.

Figure 4:
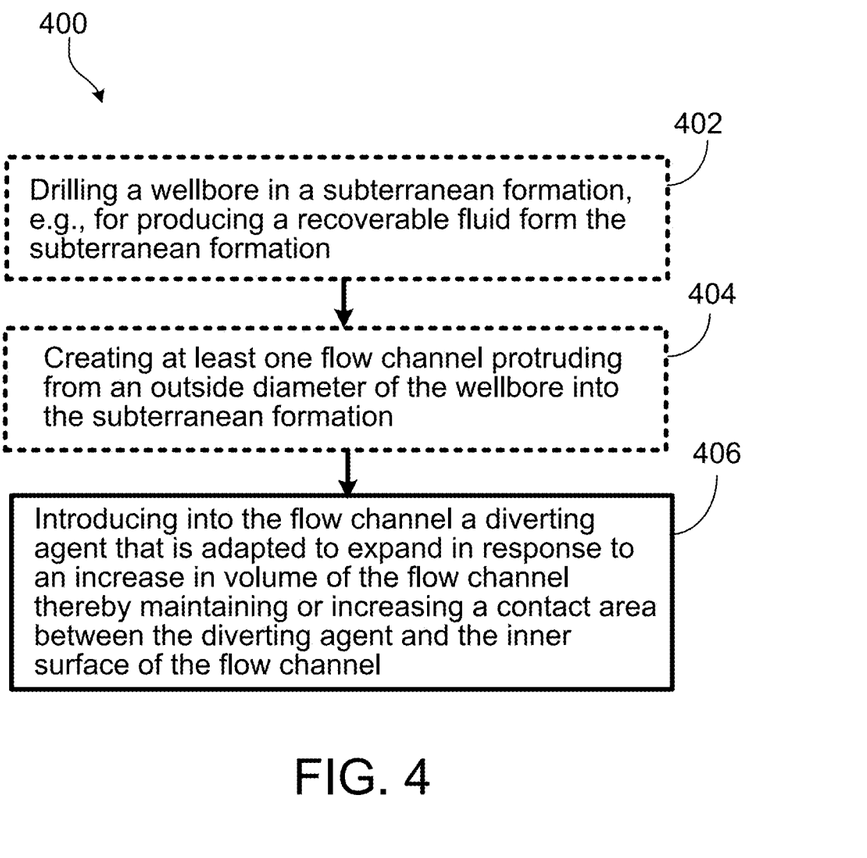
FIG. 4 is a flow-chart of an exemplary process of the present disclosure.

An exemplary process 400 of treating a subterranean formation described in the present disclosure is schematically shown in FIG. 4. Referring to FIG. 4, the process optionally includes a step 402 of drilling a wellbore in a subterranean formation, for example, for producing a recoverable fluid, such as water or oil, from the subterranean formation. The process also optionally includes a step 404 of creating at least one flow channel, such as a fracture or a wormhole, protruding from an outside perimeter or diameter of the wellbore and into the subterranean formation. Suitable examples of creating flow channels in the subterranean formation include hydraulic fracturing and acid treatments. Another example of creating a flow channel includes perforation. The perforation can be carried out using a jet gun with explosive charges, bullet perforating, abrasive jetting, or high-pressure fluid jetting. Finally, the exemplary process 400 includes a step 406 of introducing into the flow channel an expandable diverting agent.

In some embodiments, the diverter of the present disclosure is flexible and elastically expandable material. As used herein, the term "expandable" refers to the ability of the diverter material to be reversibly compressed in size or volume. For example, the expandable diverter can be compressed under the downhole pressure to be about 90 v/v %, about 50 v/v %, or about 10 v/v % less compared to the volume that the material has at a normal atmospheric pressure. Once the pressure is released, for example, by an increasing volume of the flow channel, the compressed diverter material expands up to and including the volume possessed by the material at the normal atmospheric pressure.

One example of the flexible, expandable diverter material is a thermoplastic or a thermosetting polymer, such as a polyurethane. In some embodiments, the flexible, expandable diverter material is a flexible porous polyurethane material. A polyurethane diverter of the present disclosure may be a porous material prepared by reacting a polyol monomer (e.g., a diol, a triol, or a tetraol) and a polyisocyanate monomer (a di- or a triisocyanate), optionally in the presence of other additives. Examples of other additives include catalysts (e.g., gelling catalysts), stabilizers, cell openers, water, blowing agents, and other materials generally known to be useful for making polyurethanes and polyurethane foams, such as porous polyurethanes and polyurethane foams.

The flexible, expandable polyurethane diverter material can also be prepared by emulsion polymerization. In one example, such emulsion polymerization can be carried out with an organic phase and an aqueous phase. The organic phase can include an isocyanate component, a polyol component, and also an optional additional component. Examples of optional additional components in the organic phase include a solvent, an emulsifier, and a surfactant. The aqueous phase can include an aqueous solvent and an optional additional component. Examples of optional additional components of the aqueous phase include a catalyst, a salt, and a cell opener. During the emulsion polymerization, the isocyanate component may react with the polyol component in the organic phase and also with water in the aqueous phase to form the expandable polyurethane diverter material.

The flexible, expandable polyurethane diverter material can also be are prepared in organic solvents by polycondensation. In one example, an isocyanate component, a polyol component, water and also an optional additional component are dispersed in organic solvents. Examples of organic solvents include aliphatic hydrocarbons, aromatic hydrocarbons, and petroleum distillate fractions such as mineral oil, kerosene, naphtha and diesel. Examples of optional additional components include a catalyst and a surfactant. During the reaction, the isocyanate component may react with the polyol component to form polyurethane prepolymer. The formed polyurethane prepolymer is immiscible with the organic solvent and would form small droplets in the liquid mixture. The isocyanate groups from polyurethane prepolymer in the small droplets may further react with polyol components and also with water to form the expandable polyurethane diverter material.

In one embodiment, the expandable polyurethane diverter material can be prepared before injection. That is, various polyurethane components, including isocyanate, polyol, and optionally a catalyst, a stabilizer, a solvent, a surfactant, and a cell opener, can be blended and allowed to cure (set) prior to injection. The resultant solid, flexible, and expandable material can be pumped downhole, for example, as a part of an oil-water-emulsion, or in a form of a slurry. In another embodiment, the flexible, expandable polyurethane foam material is formed in situ downhole in a flow channel (e.g., a fracture or a wormhole) within the subterranean formation. In this embodiment, two components may be mixed prior to injection to form a liquid pre-polymer blend. In one example, the first component may include an isocyanate, while the second component may include a polyol, and optionally a catalyst, a stabilizer, and a cell opener. In another example, the first component may include an isocyanate, a polyol, and optionally a solvent, and emulsifier, or a surfactant, while the second component may include an aqueous phase, and optionally a catalyst, a salt, and a cell opener. In another example, the first component may include an isocyanate, a polyol, water and optionally a surfactant, while the second component may include organic solvent, and optionally a catalyst.

The liquid pre-polymer blend may be pumped to the wellbore at a pressure sufficient to place the liquid from the wellbore into at least one flow channel within the subterranean formation. The pumping time may be less than the amount of time necessary for the prepolymer to cure (set) and form an expandable polyurethane foam diverter material. That is, the pumping may be carried out sufficiently fast for the liquid prepolymer to flow from the wellbore into at least one flow channel within the subterranean formation, and then cure (set) inside the flow channel to form a flexible, expandable polyurethane diverting agent. In some embodiments, the curing time of the liquid pre-polymer polyurethane diverting agent is from about 5 min to about 2 hours, or from about 10 min to about 30 min.

Suitable examples of a polyol component of the polyurethane diverting agent include polymeric alcohols having a hydroxyl number in a range from about 14 to about 2,000. Examples of such polyols include polyether polyols, polyester polyols, and polycarbonate polyols. One example of polyester polyol is polycaprolactone (PCL). Another example of a polyol component is polycaprolactone triol. Yet another example is polypropylene glycol polyol.

Suitable examples of a polyisocyanate component of the polyurethane diverting agent include an aliphatic isocyanate, a cycloaliphatic isocyanate, an aromatic isocyanate, and isocyanate groups terminated polyurethane prepolymer. For example, polyisocyanate may be selected from isophorone diisocyanate (IPDI), hexamethylene diisocyanate (HDI), toluene diisocyanate (TDI), methylene diphenyl diisocyanate (MDI), polymeric diphenylmethane diisocyanate (PMDI), or any combination thereof.

Suitable examples of catalysts useful to prepare the polyurethane diverting agent include an organometallic compound and a tertiary amine compound. Examples of such compounds include dibutyltin dilaurate, stannous octoate, an organobismuth compound, triethylene diamine, bis(dimethylaminoethyl)ether, and dimethylethanolamine. Another example of a catalyst is DABCO.

Suitable examples of stabilizers and emulsifiers useful to prepare the polyurethane diverting agents of the present disclosure include nonionic surfactants, anionic surfactants, and cationic surfactants. Examples of such surfactants include polyethersiloxane, a fatty sulfonic acid, and a fatty acid, or a salt thereof (e.g., sodium salt, potassium salt, or calcium salt).

Suitable examples of cell openers useful to prepare the polyurethane diverting agents of the present disclosure include polyolefins, waxy aliphatic hydrocarbons, and salts of long-chain fatty acids (e.g., calcium salt of stearic acid, i.e., calcium stearate).

The expandable polyurethane diverter of the present disclosure may be a foam containing closed cells, open cells, or a mixture of closed and open cells. The term "cells" as used in this disclosure refers to gas bubbles, such as air and carbon dioxide bubbles, trapped inside the polyurethane material. In one example, the polyurethane foam contains at least about 50%, at least about 30%, or at least about 10% of the closed cells content.

The expandable polyurethane diverter of the present disclosure may be polyurethane particles (e.g., prepared by any of the methods described herein).

In one embodiment, the methods of the present disclosure include introducing into the flow channel of the subterranean formation a slurry including solid particles of a flexible porous polyurethane material. In this embodiment, the expandable diverter of the present disclosure may be preformed in a manufacturing facility into particulates of various sizes (e.g., particles having 5 µm to 500 mm nominal dimension) and shapes. Examples of particle shapes include spherical, cubical, rectangular, or irregular shapes. The solid particles may be produced from the bulk expandable diverter material mechanically, such as by chopping, grinding, or extruding the bulk material. The particles may also be formed chemically by agitation of the polyurethane prepolymer in another immiscible liquid, as such mineral oil or water. Without being bound by any particular theory, it is believed that the agitation in immiscible liquid cause the prepolymer to form small droplets, and once cured or polymerized, the droplets become discrete particles of spherical or nearly spherical shape. The size of the particles may be controlled by the agitation energy and time, and also by varying the concentration of polyurethane prepolymer in the immiscible liquid. Range of size of the droplet and the subsequent particles may vary from about 5 µm to about 50 mm. In one example, the particle size is from 100 µm to 10 mm. In another example, the particles (e.g., in a form of a blend of multiple sizes), may be carried to a flow channel within the subterranean formation in a slurry with a fracturing fluid and then squeezed by the flow pressure into the flow channel (e.g., existing fracture) to form an agglomerated particulate pack. The agglomerated particulate pack expands as each particle of the pack expands in response to increase in the dimension of the flow channel, and continuously pushes against the walls of the flow channel to seal the flow channel and block the flow of the fluid into the flow channel.

Another example of the flexible, expandable diverter material is a hydrogel. In some embodiments, the flexible, expandable diverter material is a crosslinked hydrogel. The hydrogel can be prepared from the chemical precursor materials and then injected downhole as a liquid, solid, or a slurry or a dispersion of a particulate material. The particle size of the pre-expanded hydrogel particulate material ranges from about 50 µm to about 2 mm. When injected as a fluid dispersion, an amount of pre-expanded particulate hydrogel material in the fluid dispersion ranges from about 1 v/v % to about 70 v/v % based on the volume of the dispersion.

In one embodiment, the expandable hydrogel is formed in situ downhole in a flow channel (e.g., a fracture or a wormhole) within the subterranean formation. In this embodiment, two hydrogel precursor components may be mixed prior to injection to form a liquid blend. In this case, the liquid blend (containing the hydrogel fiber component and the crosslinker component) may be pumped to the wellbore at a pressure sufficient to place the liquid from the wellbore into at least one flow channel within the subterranean formation. The pumping time may be less than the amount of time necessary for the two components to chemically react to form a crosslinked, expandable hydrogel diverter material. That is, the pumping may be carried out sufficiently fast for the liquid hydrogel components to flow from the wellbore into at least one flow channel within the subterranean formation, and then undergo a crosslinking reaction inside the flow channel to form a flexible, expandable hydrogel diverting agent. In some embodiments, the crosslinking reaction time is from about 5 min to about 2 hours, or from about 10 min to about 30 min.

Suitable examples of the hydrogel fiber components include natural polymers, synthetic polymers, or a hybrid of natural and synthetic polymers. In some embodiments, the crosslinked hydrogel of the present disclosure includes a plurality of polymer fibers selected from natural polymers, synthetic polymers, and a hybrid of natural and synthetic polymers. Examples of natural polymers include polysaccharides, such as guar gum, cellulose, hyaluronic acid, gelatin, and alginate, and their functionalized derivatives. Examples of synthetic polymers include poly(ethylene glycol), poly(lactic acid), poly(glycolic acid), poly($\varepsilon$-caprolactone), poly(acrylic acid), polyvinyl alcohol, poly(N-isopropylacryl amide), polyvinylpyrrolidone, and co-polymers thereof. The hydrogel fibers can be crosslinked physically or chemically. In some embodiments, the polymer fibers of the crosslinked hydrogel are crosslinked by a crosslinking agent. Suitable examples of chemical crosslinking reagents include hexamethylene glycol, 1,2-bis(2-iodoethoxy)ethane, glyoxal, cystamine, DHSO crosslinker (3,3'-sulfinyldi(propanehydrazide), dihydrazide sulfoxide), DSSO crosslinker (bis(2,5-dioxopyrrolidin-1-yl) 3,3'-sulfinyldipropionate, bis-(propionic acid NHS ester)-sulfoxide), and other reagents capable of chemically connect two or more of the polymer fibers.

Typically, the hydrogels expand by absorbing fluids such as organic solvents and water. The fluid absorption causes the hydrogel to swell, thereby increasing its volume. In one example, the expanded hydrogen is about 400 v/v %, about 300 v/v %, or about 110 v/v % of the hydrogel volume before the fluid absorption.

The expandable diverting agent of the present disclosure can be delivered to the desired area of the subterranean formation by any available means. A skilled engineer would be able to select and implement suitable methods and apparatuses for placing the diverting agents of the present disclosure into the desired area of a subterranean formation. In one example, the expandable diverting agent can be pumped (or injected) downhole as a bulk (neat) liquid. The diverter material can also be placed downhole as a solid, for example, as a composition of discrete particles, such as milled or ground particles or microparticles. The diverter material can be injected in a composition, for example, the diverter can be pumped downhole as a solution, emulsion, slurry, or dispersion in a carrier fluid. In one example, the diverter material can be pumped downhole in admixture with stimulation fluid, fracturing fluid, acidizing fluid, drilling fluid, clean-up fluid, spotting fluid, completion fluid, remedial treatment fluid, abandonment fluid, cementing fluid, or packer fluid. An amount of diverter material in the composition may vary from about 1 wt. % to about 50 wt. %, or from about 5 wt. % to about 20 wt. %. During a wellbore stimulation treatment, for example, the diverter agent can be injected in the wellbore before, after, or concurrently with the simulation fluid.

In some embodiments, the diverting agents of the present disclosure are degradable. The term "degradable" refers to the ability of the material to be broken down into smaller fragments, under the influence of biological, chemical, or physical factors. In one aspect, the agents are biodegradable, for example, by an enzyme that can be injected downhole to dissolve the plug after the stimulation treatment is completed. In another aspect, the agents are chemically degradable, for example, by hydrolysis, oxidation, or reduction. In yet another aspect, the diverter agents can be degraded by heat, light, or pressure (e.g., excessive pressure). In some embodiments, the diverter plugs are physically removable from the flow channels of the subterranean formation. For example, the diverter plugs can be washed out by the recoverable fluid flowing out of the subterranean formation into the wellbore and to the surface.

Definitions

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (for example, 1%, 2%, 3%, and 4%) and the sub-ranges (for example, 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, that is not otherwise defined, is for the purpose of description only and not of limitation. Any use of section headings is intended to aid reading of the document and is not to be interpreted as limiting; information that is relevant to a section heading may occur within or outside of that particular section.

In the processes described in the present disclosure, the acts or steps can be carried out in any order, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the disclosed or claimed process.

The term "about" as used in this disclosure can allow for a degree of variability in a value or range, for example, within 10%, within 5%, or within 1% of a stated value or of a stated limit of a range.

The term "substantially" as used in this disclosure refers to a majority of, or mostly, as in at least about 50%, 60%, 70%, 80%, 90%, 95%, 96%, 97%, 98%, 99%, 99.5%, 99.9%, 99.99%, or at least about 99.999% or more.

As used in this disclosure, the term "polymer" refers to a molecule having at least one repeating monomer unit and can include homopolymers, copolymers, terpolymers, and tetrapolymers. That is, "polymer" as used in this disclosure may contain one or more different monomer units (for example, 1, 2, 3, or 4 different monomers).

As used in this disclosure, the term "fluid" refers to gases, liquids, gels, slurries with a substantial solids content, and critical and supercritical materials.

As used herein, the term "stimulation fluid" refers to fluids or slurries used downhole during stimulation activities of the well that can increase the production of a well, including perforation activities. In some examples, a stimulation fluid can include a fracturing fluid or an acidizing fluid.

As used in this disclosure, the term "fracturing fluid" refers to fluids or slurries used downhole during hydraulic fracturing operations.

As used herein, the term "acidizing fluid" refers to fluids or slurries used downhole during acidizing treatments. In one example, an acidizing fluid is used in a clean-up operation to remove material obstructing the flow of desired material, such as material formed during a perforation operation. In some examples, an acidizing fluid can be used for damage removal.

As used herein, the term "drilling fluid" refers to fluids, slurries, or muds used in drilling operations downhole, such as during the formation of the wellbore.

As used herein, the term "clean-up fluid" refers to fluids or slurries used downhole during clean-up activities of the well, such as any treatment to remove material obstructing the flow of desired material from the subterranean formation. In one example, a clean-up fluid can be an acidification treatment to remove material formed by one or more perforation treatments. In another example, a clean-up fluid can be used to remove a filter cake.

As used herein, the term "spotting fluid" refers to fluids or slurries used downhole during spotting operations, and can be any fluid designed for localized treatment of a downhole region. In one example, a spotting fluid can include a lost circulation material for treatment of a specific section of the wellbore, such as to seal off fractures in the wellbore and prevent sag. In another example, a spotting fluid can include a water control material. In some examples, a spotting fluid can be designed to free a stuck piece of drilling or extraction equipment, can reduce torque and drag with drilling lubricants, prevent differential sticking, promote wellbore stability, and can help to control mud weight.

As used herein, the term "completion fluid" refers to fluids or slurries used downhole during the completion phase of a well, including cementing compositions.

As used herein, the term "remedial treatment fluid" refers to fluids or slurries used downhole for remedial treatment of a well. Remedial treatments can include treatments designed to increase or maintain the production rate of a well, such as stimulation or clean-up treatments.

As used herein, the term "abandonment fluid" refers to fluids or slurries used downhole during or preceding the abandonment phase of a well.

As used herein, the term "cementing fluid" refers to fluids or slurries used during cementing operations of a well. For example, a cementing fluid can include an aqueous mixture including at least one of cement and cement kiln dust. In another example, a cementing fluid can include a curable resinous material such as a polymer that is in an at least partially uncured state.

As used herein, the term "packer fluid" refers to fluids or slurries that can be placed in the annular region of a well between tubing and outer casing above a packer. In various examples, the packer fluid can provide hydrostatic pressure in order to lower differential pressure across the sealing element, lower differential pressure on the wellbore and casing to prevent collapse, and protect metals and elastomers from corrosion.

As used herein, a "carrier fluid" refers to any suitable fluid for suspending, dissolving, mixing, or emulsifying with one or more materials to form a composition. For example, the carrier fluid can be at least one of crude oil, dipropylene glycol methyl ether, dipropylene glycol dimethyl ether, dipropylene glycol methyl ether, dipropylene glycol dimethyl ether, dimethyl formamide, diethylene glycol methyl ether, ethylene glycol butyl ether, diethylene glycol butyl ether, butylglycidyl ether, propylene carbonate, D-limonene, a $C_2$-$C_{40}$ fatty acid $C_1$-$C_{10}$ alkyl ester (e.g., a fatty acid methyl ester), 2-butoxy ethanol, butyl acetate, butyl lactate, furfuryl acetate, dimethyl sulfoxide, dimethyl formamide, a petroleum distillation product of fraction (e.g., diesel, kerosene, napthas, and the like) mineral oil, a hydrocarbon oil, a hydrocarbon including an aromatic carbon-carbon bond (e.g., benzene, toluene), a hydrocarbon including an alpha olefin, xylenes, an ionic liquid, methyl ethyl ketone, an ester of oxalic, maleic or succinic acid, methanol, ethanol, propanol (iso- or normal-), butyl alcohol (iso-, tert-, or normal-), an aliphatic hydrocarbon (e.g., cyclohexanone, hexane), water, brine, produced water, flowback water, brackish water, and sea water. The fluid can form about 0.001 wt. % to about 99.999 wt. % of a composition, or a mixture including the same, or about 0.001 wt. % or less, 0.01 wt. %, 0.1, 1, 2, 3, 4, 5, 6, 8, 10, 15, 20, 25, 30, 35, 40, 45, 50, 55, 60, 65, 70, 75, 80, 85, 90, 95, 96, 97, 98, 99, 99.9, 99.99, or about 99.999 wt. % or more. A carrier fluid or slurry can also contain proppant particles, such as particles of sand or silica.

As used in this disclosure, the term "subterranean material" or "subterranean formation" refers to any material under the surface of the earth, including under the surface of the bottom of the ocean. For example, a subterranean formation or material can be any section of a wellbore and any section of a subterranean petroleum- or water-producing subterranean formation or region in fluid contact with the wellbore. Placing a material in a subterranean formation can include contacting the material with any section of a wellbore or with any subterranean region in fluid contact with the wellbore. Subterranean materials can include any materials placed into the wellbore such as cement, drill shafts, liners, tubing, casing, or screens; placing a material in a subterranean formation can include contacting with such subterranean materials. In some examples, a subterranean formation or material can be any below-ground region that can produce liquid or gaseous petroleum (hydrocarbon) materials, water, or any section below-ground in fluid contact with the liquid or gaseous petroleum material. For example, a subterranean formation or material can be at least one of an area desired to be fractured, a fracture or an area surrounding a fracture, and a flow pathway (channel) or an area surrounding a flow pathway or channel. The fracture or a flow pathway can be optionally fluidically connected to a subterranean petroleum- or water-producing region, directly or through one or more fractures or flow pathways.

As used in this disclosure, "treatment of a subterranean formation" can include any activity or process directed to extraction of a recoverable fluid, such as water or petroleum materials, from a subterranean recoverable fluid-producing subterranean formation or region, for example, including drilling, stimulation (including hydraulic fracturing and matrix treatment), clean-up, acidizing, completion, cementing, remedial treatment, water control, abandonment, and the like.

As used in this disclosure, the terms "flow pathway" and a "flow channel" are used interchangeably and refer to any suitable subterranean flow pathway through which two subterranean locations are in fluid connection. One example is a flow channel between a hydrocarbon reservoir and a wellbore. The flow pathway can be sufficient for petroleum or water to flow from one subterranean location to the wellbore or vice-versa. A flow pathway can include at least one of a hydraulic fracture, a wormhole, and a fluid connection across a screen, across gravel pack, across proppant, including across resin-bonded proppant or proppant deposited in a fracture, and across sand. A flow pathway can include a natural subterranean passageway between subterranean formation matrices through which fluids can flow.

EXPERIMENTS

Experiment 1—Polyurethane-Based Diverter

Two components (component A and component B) were blended in injected in a wellbore as a liquid. Component A contains isocyanate monomer or isocyanate terminated prepolymers. Component B contains polyester polyol, water, catalyst, stabilizer, and cell opener. Isocyanate monomers include isophorone diisocyanate (IPDI), hexamethylene diisocyanate (HDI), toluene diisocyanate (TDI), or methylene diphenyl diisocyanate (MDI). Polyester polyols include poly (ε-caprolactone) (PCL) (MW from about 500 to about 3000). Catalysts include T-12 (dibutyltin dilaurate) or TEGOAMIN 33. Example of a stabilizer include TEGOSTAB 8300. Example of a cell opener includes calcium stearate. As an experiment, the liquid blend was injected into a parallel plate device under temperature and pressure resembling the reservoir conditions. Once the components A and B have reacted, the product in the simulated flow channel was an expandable polyurethane.

Experiment 2—Polyurethane-Based Diverter

Two components (component A and component B) were blended as a high internal phase emulsion (HIPE). Component A was an organic phase of the emulsion containing isocyanate, polyester polyol, solvent, and a surfactant. Component B was an aqueous phase containing water, catalyst, and salt. Isocyanate component includes isophorone diisocyanate (IPDI), hexamethylene diisocyanate (HDI), toluene diisocyanate (TDI), or methylene diphenyl diisocyanate (MDI). Polyester polyol component includes poly(ε-caprolactone) (MW from about 500 to about 3000). An example of a catalyst includes T-12. An example of an emulsifier includes polyglycerol polyricinoleate (PALSGAARD 4125). An example of a salt includes sodium chloride. The premixed emulsion containing A and B was injected into a parallel plate device under temperature and pressure resembling the reservoir conditions. Once set, the product was a porous polyurethane.

Experiment 3—Polyurethane-Based Diverter

Two components (component A and component B) were blended as an oil in water emulsion. Component A was an organic phase of the emulsion containing isocyanate component, polyester polyol component (optionally with small amount of water), and a stabilizer. Component B is an aqueous phase containing water, catalyst, emulsifier, and salt. Isocyanate component includes isophorone diisocyanate (IPDI), hexamethylene diisocyanate (HDI), toluene diisocyanate (TDI), or methylene diphenyl diisocyanate (MDI). Polyester polyol component includes poly(ε-caprolactone) (MW is from about 500 to about 3000). Examples of a catalyst include T-12 (dibutyltin dilaurate) and TEGOAMIN 33. Example of a stabilizer includes TEGOSTAB 8300. Example of a cell opener includes calcium stearate. Example of an emulsifier includes non-ionic surfactant with a hydrophilic-lipophilic balance (HLB) of about 12. Once set, the product was a slurry of expandable polyurethane particles.

Experiment 4—Injectable and Degradable Hydrogel-Based Diverter

Hydrogel was formed using natural polymers. Examples of natural polymers include cellulose polymers, such as chitosan, dextran, alginate, and hyaluronic acid (HA) with chemical modifications to enable crosslinking. The hydrogels were formed using various cross-linking methods. Fibers, including polylactic acid (PLA) fiber, were added to strengthen the rigidity of the hydrogel. Once set, the product was a bulk expandable gel. The crosslink time was from about 10 to about 30 minutes from the time of the fluid blend injection.

Experiment 5—Injectable and Degradable Hydrogel-Based Diverter

Microgels made of synthetic polymers including polyacrylamide (PAM), polyacrylic acid (PAA), polyethylene glycol (PEG), polylactic acid (PLA), or polyglycolic acid (PGA), were prepared by an inverse emulsion method. The preformed microgels were expandable hydrogels for injection as diverting agents.

EXAMPLES

Example 1—Polyurethane-Based Diverter

First, 20 g of polycaprolactone triol, 0.3 g of water, 0.5 g of VORASURF™ DC5043 surfactant, 0.04 g of dibutyltin dilaurate and 0.015 g of Dabco®33-LV catalyst were weighed into a plastic beaker and mixed under overhead agitation. Next, 0.24 g of calcium stearate cell opener was added to the liquid mixture and mixed until all solid materials well dispersed. Then, 8 g of toluene diisocyanate was added to the beaker and mixed for another 1 min. Finally, the formed mixture was allowed to expand at room temperature. After the materials stopped expanding at room temperature, the beaker was placed in 80° C. oven, and was allowed to cure for 20 h. Once set, the product obtained was a polyurethane foam.

Example 2—Polyurethane-Based Diverter

Figure 5:
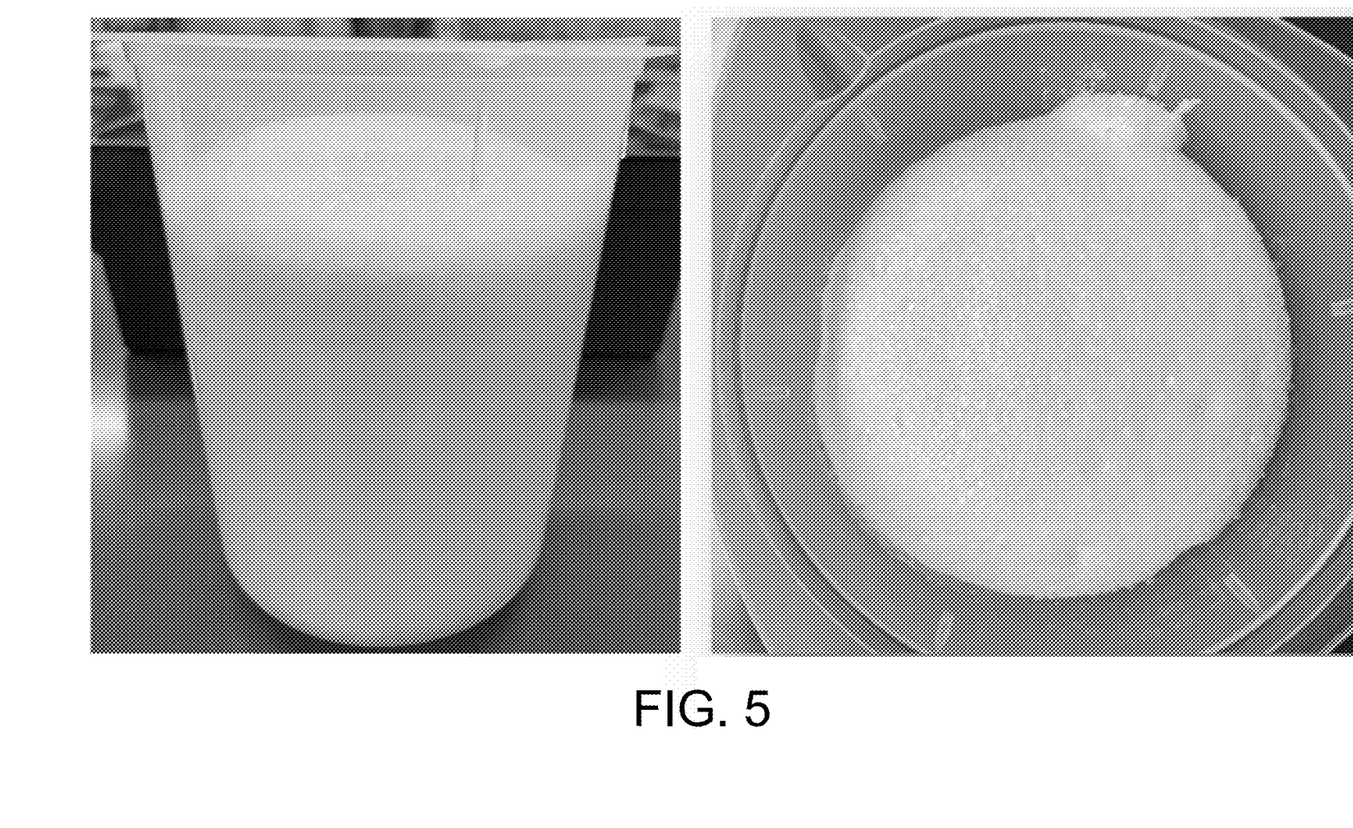
FIG. 5 is an image depicting a polyurethane foam sample.

First, 16 g of polycaprolactone triol, 0.16 g of water, 0.3 g of VORASURF™ DC5043 surfactant, 0.016 g of dibutyltin dilaurate and 0.018 g of Dabco®33-LV catalyst were weighed into a plastic beaker and mixed under overhead agitation. Next, 16 g of sodium chloride and 0.2 g of calcium stearate cell opener were added to the liquid mixture and mixed until all solid materials well dispersed. Then, 6.24 g of toluene diisocyanate was added to the beaker and mixed for another 1 min. Finally, the formed mixture was allowed to expand at room temperature. After the materials stopped expanding at room temperature, the beaker was placed in 80° C. oven, and allowed to cure for 20 h. Once set, the product was obtained as a polyurethane foam. An image of formed polyurethane foam is shown in FIG. 5.

Example 3—Polyurethane-Based Diverter

Figure 6:
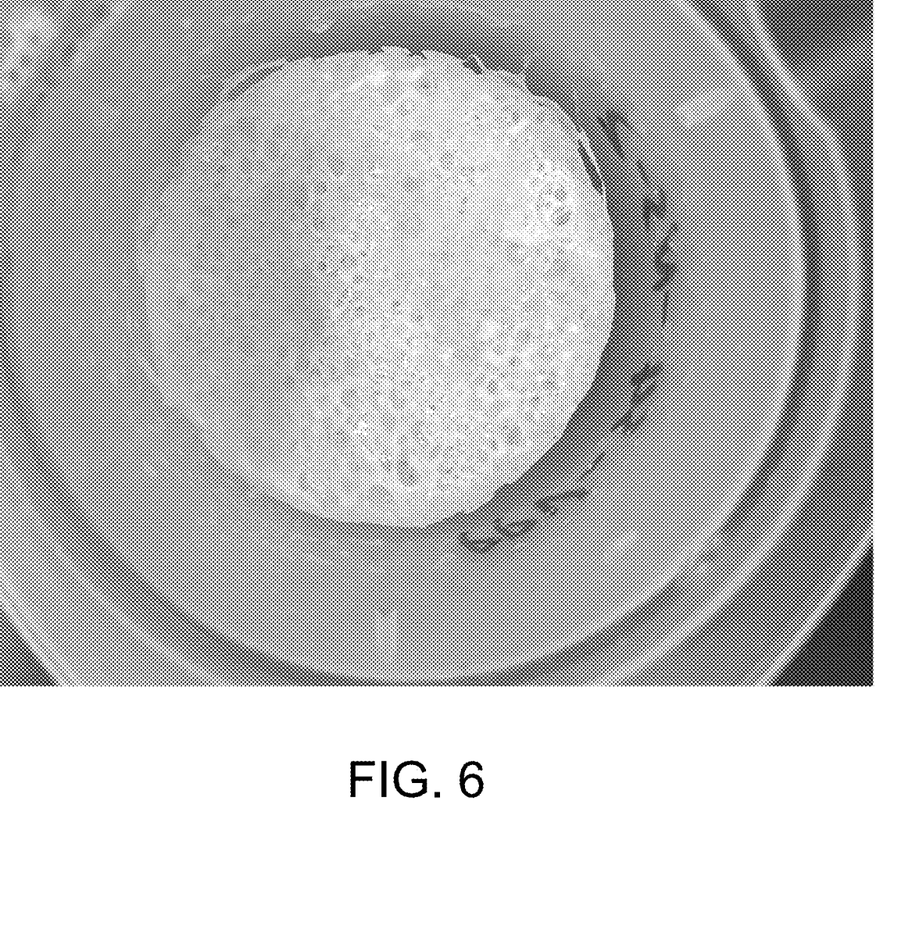
FIG. 6 is an image depicting porous polyurethane material prepared via high internal phase emulsion polymerization.

Porous polyurethane materials were prepared via high internal phase emulsion polymerization. First, 10 g of polycaprolactone triol, 13 g of isophorone diisocyanate, and 4 g of Synperonic PE/L121 surfactant were weighed into a plastic beaker. The compounds were mixed under overhead agitation to form organic phase. Next, 1.5 g of sodium chloride was dispersed in 75 g of water, and 0.2 g of dibutyltin dilaurate catalyst was then added to the aqueous solution to form the aqueous phase. Then, the aqueous phase was added dropwise to the oil phase under agitation. After the addition was completed, the mixture was stirred for another 10 min at 500 rpm to form the water-in-oil high internal phase emulsion. Finally, the formed emulsion was allowed to cure in 80° C. oven for around 20 h. Once set, the product was obtained as a flexible porous polyurethane material. An image of formed porous polyurethane material is shown in FIG. 6.

Example 4—Polyurethane-Based Diverter

First, 32 g of polypropylene glycol polyol and 5 g of toluene diisocyanate were charged into a three-neck round bottom flask and reacted at 70° C. for 1 h under overhead agitation. Next, 300 g of mineral oil, 4 g of water and 1 g of dibutyltin dilaurate catalyst were added to the reactor. The reaction was carried out at 50° C. for another 4 h under agitation. Polymeric particles formed in mineral oil as reaction continued. After the reaction was stopped, the formed particles were filtered, washed with methanol and dried overnight at room temperature. Flexible polyurethane particles were obtained.

Example 5—Polyurethane-Based Diverter

Figure 7:
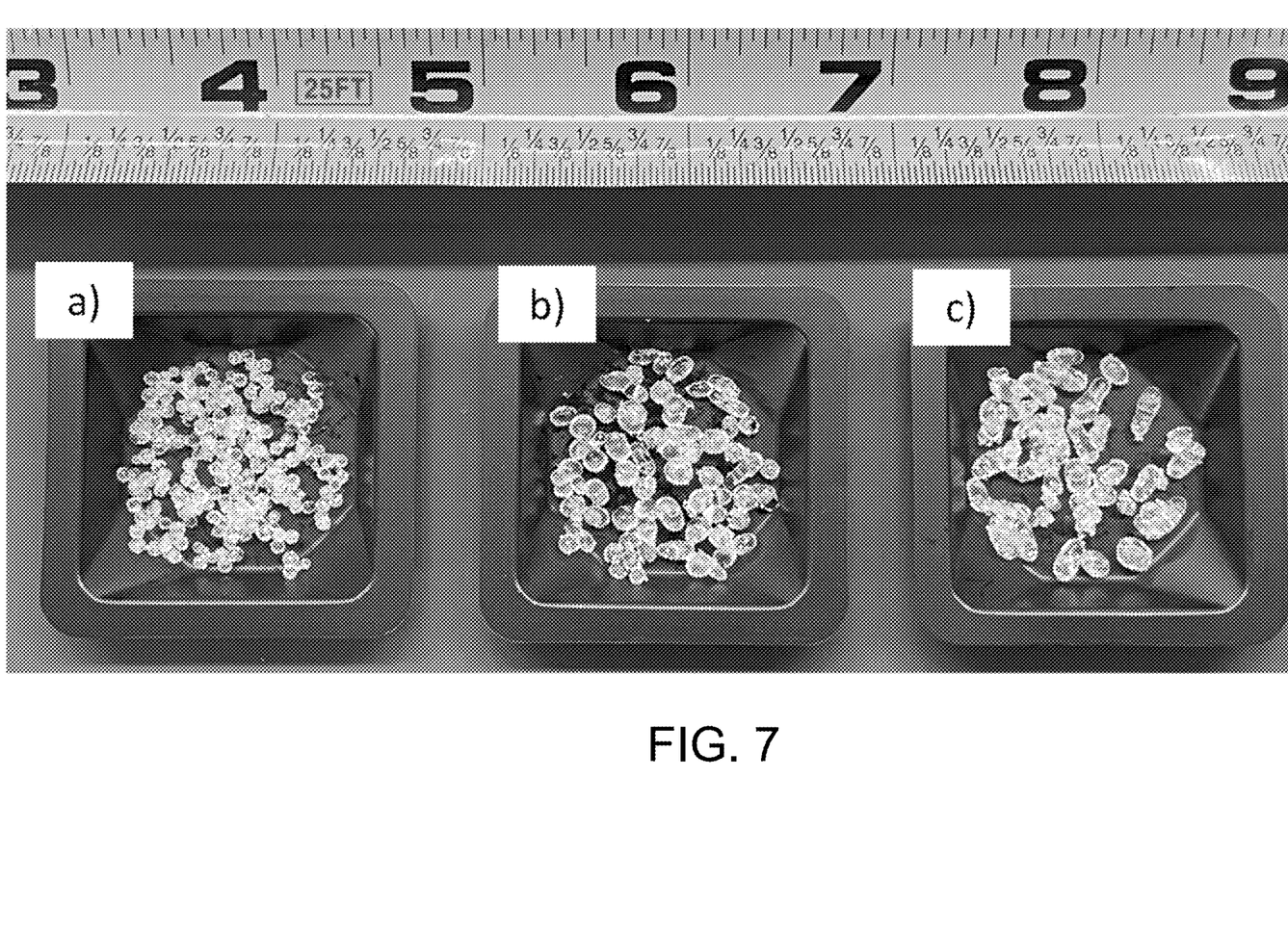
FIG. 7 is an image depicting polyurethane particles.

First, 8 g of Desmodur® E 14 aromatic polyisocyanate prepolymer, 0.1 g of dibutyltin dilaurate catalyst and 100 g of mineral oil were charged into a three-neck round bottom flask and mixed for 1 min under overhead agitation. Next, 2 g of water was added to the reactor. The reaction was carried out at 50° C. for 4 h under agitation. Polymeric particles formed in mineral oil as reaction continued. After the reaction was stopped, the formed particles were filtered, washed with methanol and dried overnight at room temperature. Flexible polyurethane particles were obtained. An image of formed polyurethane particles is shown in FIG. 7 (subsection a).

Example 6—Polyurethane-Based Diverter

First, 13 g of Desmodur® E 14 aromatic polyisocyanate prepolymer, 0.1 g of dibutyltin dilaurate catalyst and 100 g of mineral oil were charged into a three-neck round bottom flask and mixed for 1 min under overhead agitation. Next, 2 g of water was added to the reactor. The reaction was carried out at 50° C. for 4 h under agitation. Polymeric particles formed in mineral oil as reaction continued. After the reaction was stopped, the formed particles were filtered, washed with methanol and dried overnight at room temperature. Flexible polyurethane particles were obtained. An image of formed polyurethane particles is shown in FIG. 7 (subsection b).

Example 7—Polyurethane-Based Diverter

First, 2 g of water, 0.5 g of dibutyltin dilaurate catalyst and 100 g of mineral oil were charged into a three-neck round bottom flask and mixed for 5 min under overhead agitation. Next, 8 g of Desmodur® E 14 aromatic polyisocyanate prepolymer was added dropwise to the reactor. The reaction was carried out at 50° C. for 4 h under agitation. Polymeric particles formed in mineral oil as reaction continued. After the reaction was stopped, the formed particles were filtered, washed with methanol and dried overnight at room temperature. Flexible polyurethane particles were obtained. An image of formed polyurethane particles is shown in FIG. 7 (subsection c).

OTHER EMBODIMENTS

It is to be understood that while the present disclosure has been described in conjunction with the detailed description thereof, the foregoing description is intended to illustrate and not limit the scope of the present disclosure, which is defined by the scope of the appended claims. Other aspects, advantages, and modifications are within the scope of the following claims.

What is claimed is:

1. A method of treating a subterranean formation penetrated by a wellbore and comprising a flow channel protruding from an outside diameter of the wellbore into the subterranean formation, the method comprising
introducing into the flow channel a diverting agent that is adapted to expand in response to an increase in size or volume of the flow channel thereby maintaining or increasing a contact area between the diverting agent and an inner surface of the flow channel,
wherein the diverting agent comprises a flexible porous polyurethane material and introducing the diverting agent into the flow channel comprises introducing into the flow channel a liquid pre-polymer blend comprising a polyisocyanate component and a polyol component which chemically react in the flow channel to produce the flexible porous polyurethane material.

2. The method of claim 1, wherein the treating of the subterranean formation comprises stimulation of the subterranean formation.

3. The method of claim 2, wherein the stimulation comprises hydraulic fracturing.

4. The method of claim 3, wherein the flow channel comprises a fracture.

5. The method of claim 2, wherein the stimulation comprises an acid treatment.

6. The method of claim 5, wherein the flow channel comprises a wormhole.

7. The method of claim 1, wherein the flexible porous polyurethane material comprises a polyurethane foam.

8. The method of claim 1, comprising introducing a treatment fluid into the wellbore before, after, or concurrently with introducing the diverting agent into the flowing channel.

9. The method of claim 8, wherein the treatment fluid is a stimulation fluid.

10. The method of claim 1, wherein the diverting agent is degradable.

11. The method of claim 10, wherein the diverting agent is degradable by hydrolysis, oxidation, or reduction.

12. The method of claim 10, wherein the diverting agent is degradable by light, heat, or pressure.

* * * * *